US008720297B2

(12) United States Patent
Stämpfli et al.

(10) Patent No.: US 8,720,297 B2
(45) Date of Patent: May 13, 2014

(54) PARALLEL ROBOT OF THE SCARA TYPE

(75) Inventors: Hervé Stämpfli, Oye et Pallet (FR);
Ralph Coleman, Fleurier (CH); Didier Blanc, Crans-près-Céligny (CH)

(73) Assignee: Etel S.A., Môtiers (CH)

( * ) Notice: Subject to any disclaimer, the term of this patent is extended or adjusted under 35 U.S.C. 154(b) by 260 days.

(21) Appl. No.: 13/128,501

(22) PCT Filed: Oct. 15, 2009

(86) PCT No.: PCT/EP2009/007398
§ 371 (c)(1),
(2), (4) Date: Jul. 26, 2011

(87) PCT Pub. No.: WO2010/051905
PCT Pub. Date: May 14, 2010

(65) Prior Publication Data
US 2011/0271785 A1 Nov. 10, 2011

(30) Foreign Application Priority Data
Nov. 10, 2008 (CH) ...................... 1830/08

(51) Int. Cl.
*B25J 17/00* (2006.01)
*B25J 18/00* (2006.01)
*G05B 11/01* (2006.01)
*B25J 15/02* (2006.01)

(52) U.S. Cl.
USPC ....... 74/490.03; 74/490.01; 901/23; 318/560; 318/568.21; 310/114; 414/744.5

(58) Field of Classification Search
USPC .......... 74/490.01, 490.03, 490.05; 414/744.1, 414/744.2, 744.4, 744.5; 901/23, 27, 28; 318/568.21, 560, 561, 571–573; 310/114, 266
See application file for complete search history.

(56) References Cited

U.S. PATENT DOCUMENTS 5,539,291 A   7/1996 Reboulet
5,583,408 A * 12/1996 Lowrance .................. 318/568.1
(Continued)

FOREIGN PATENT DOCUMENTS

DE   10 2005 036 282   2/2006
JP        10 092899   4/1998
WO   WO 2007/026270   3/2007

OTHER PUBLICATIONS

International Search Report, issued in corresponding International Application No. PCT/EP2009/007398.

(Continued)

*Primary Examiner* — Troy Chambers
*Assistant Examiner* — Emily Cheng
(74) *Attorney, Agent, or Firm* — Kenyon & Kenyon LLP

(57) ABSTRACT

A parallel robot of the SCARA type includes a base or a body to which two articulated elements are attached, each including an arm and a forearm that are connected by a joint and are mounted in a manner allowing rotation about one and the same geometrical axis. The two articulated elements are attached to two annular segments, respectively, that form two movable parts of a circular motor whose stator at least partially forms the body, these two movable parts being assigned to one and the same circular path of the stator. Preferably, the two movable parts are guided through one and the same guideway in order to ensure that these two movable parts rotate very precisely about the same geometrical axis.

10 Claims, 3 Drawing Sheets

(56) References Cited

U.S. PATENT DOCUMENTS

| | | | |
|---|---|---|---|
| 6,247,889 B1 * | 6/2001 | Kono et al. | 414/744.5 |
| 6,507,258 B1 * | 1/2003 | Sadler | 335/229 |
| 6,895,831 B2 * | 5/2005 | Hunter | 73/865.9 |
| 6,949,733 B2 | 9/2005 | Widdowson et al. | |
| 7,331,750 B2 | 2/2008 | Merz et al. | |
| 7,455,466 B2 | 11/2008 | Chang et al. | |
| 2001/0012483 A1 * | 8/2001 | Kono et al. | 414/744.5 |
| 2009/0022571 A1 * | 1/2009 | Krupyshev et al. | 414/217 |

OTHER PUBLICATIONS

Written Opinion, issued in corresponding International Application No. PCT/EP2009/007398.

* cited by examiner

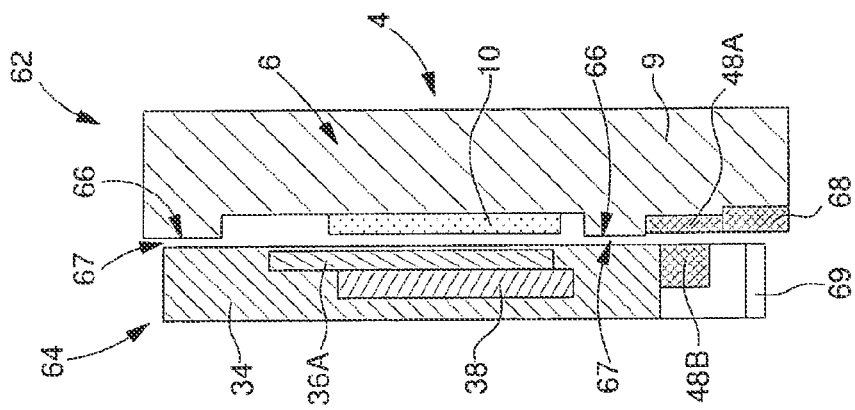
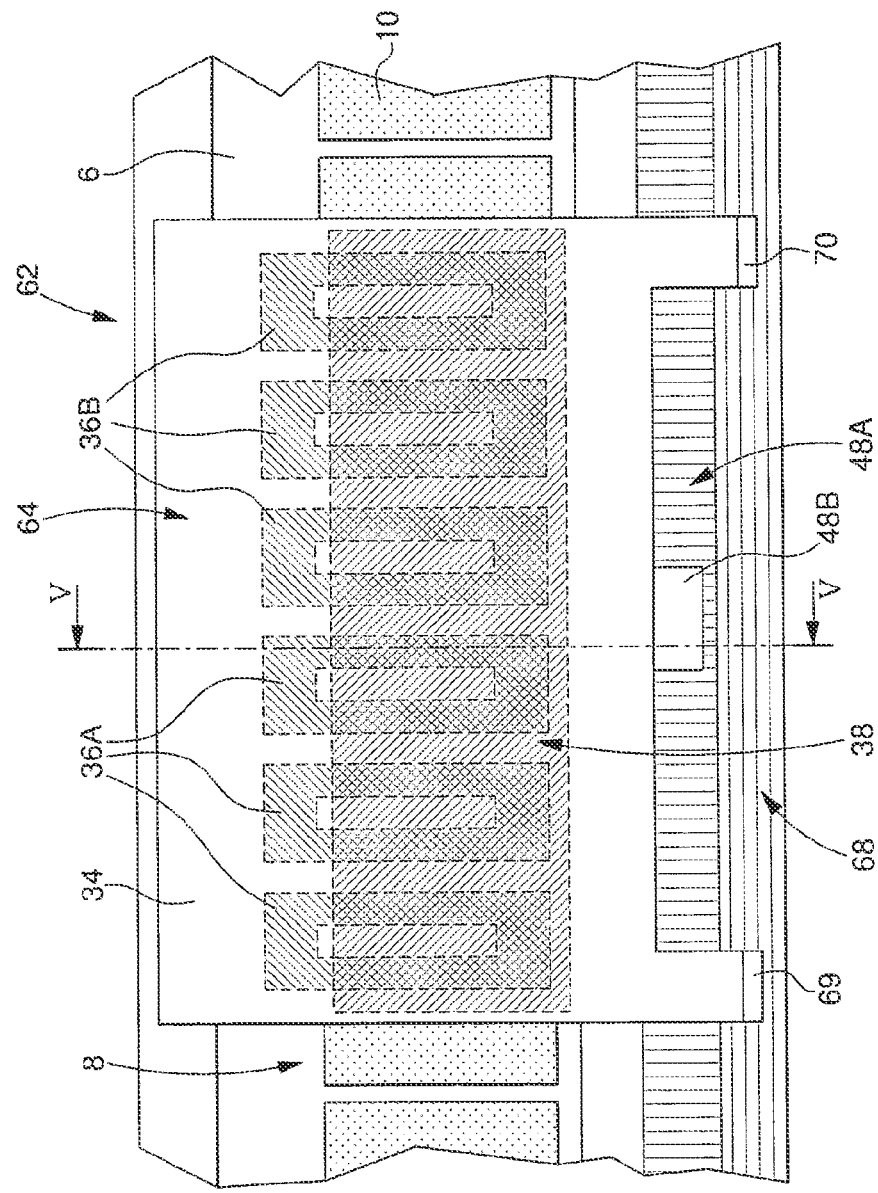

PARALLEL ROBOT OF THE SCARA TYPE

FIELD OF THE INVENTION

The present invention relates to a parallel robot of the SCARA type. Such a robot may be used in various industrial applications, particularly on assembly lines, in installations for packaging or wrapping any elements, in installations which are used to transfer units or components, as well as in applications in which the robot includes at least one sensor at its end, and in applications for machining or for welding.

BACKGROUND INFORMATION

In general, a parallel robot of the SCARA type is understood to be a robot having at least two elements, each formed of an arm and a forearm, which are mounted on two independent supports, that are rotationally movable about an axis of rotation, which theoretically coincide, the respective ends of the two forearms being joined in articulated fashion, so that these two elements thus form a closed loop, each forearm being rotationally movable at least about a geometrical axis relative to the respective arm. It should be taken into consideration that the arm is attached to its support; these two elements together form one and the same rotationally movable part, and in certain cases, may essentially coincide.

In general, the outer ends of the two forearms bear an endpiece having a tool or any sensor. This endpiece is able to move in a plane perpendicular to the axis of rotation of the two supports. The angular position of the endpiece is modified by an identical movement of the two supports, and the distance between the endpiece and the axis of rotation (the radial position of the endpiece) is modified by a differential movement of the two supports.

In one variant, the endpiece is able to be displaced along the direction of the axis of rotation of the two supports, i.e., of the two arms mentioned above. In a further variant, the tool or the sensor is able to undergo its own rotary motion with the aid of a motor or an actuator, which is disposed in the endpiece.

In a simplified arrangement of a parallel robot of the SCARA type, this robot may therefore include only two articulated elements which are mounted in a manner allowing rotation about a body or a base of this robot, the joints between the arms and the forearms, as well as the joint which is assigned to the endpiece, being formed by pivots having axes which are parallel to each other and are parallel to the geometrical axis of rotation of the two movable supports, that in each case bear the two articulated elements in a specific plane.

U.S. Pat. No. 7,331,750 describes a parallel robot of the SCARA type having a relatively complex design. This robot is designed with a third articulated element, which makes it possible to move the endpiece along a direction that is essentially parallel to the axis of rotation of the two arms of the first and of the second articulated element. Thus, these first and second articulated elements each have a joint between their arm and forearm which is formed by a spherical joint.

The arms of the first and of the second articulated element of the robot in U.S. Pat. No. 7,331,750 are attached to two annular supports, which in each case form the two rotors of two circular motors supported one upon the other. Each of these two articulated elements is therefore assigned to an individual circular motor, the two circular motors being disposed one upon the other. Firstly, it should be noted that the first and the second articulated element do not have a symmetrical structure, since the annular supports of the two respective arms lie at different levels. The production of such a robot thus represents various assembly problems with effects on the functioning of this robot. Namely, it is difficult to perfectly align the two axes of rotation of the two annular rotors, which bear the first and the second articulated element, respectively. Generally, this problem of the alignment of the axes of rotation engenders a lack of precision in the control of the first and second articulated elements, which causes a displacement of the endpiece outside of the plane perpendicular to the axis of rotation. In addition, in the special case of the simple variant described before, in which the joints are formed by pivots, an alignment error of the axes of rotation of the two rotors produces stresses in these pivots, causing them great wear. It should also be considered that the conventional robot described above includes three independent motors, in order to bring about translations of the endpiece in a cylindrical space. Ultimately, this robot has a complex and costly construction.

SUMMARY

Example embodiments of the present invention eliminate the disadvantages of the conventional systems mentioned above.

To that end, example embodiments of the present invention provide a parallel robot of the SCARA type, having:
- a body,
- two articulated elements, each including an arm and a forearm which are connected by a joint, these two articulated elements being mounted in a manner allowing rotation about one and the same geometrical axis,
- an endpiece, to which the two respective outer ends of the two forearms are connected in articulated fashion, the two articulated elements attached to two respective annular segments that form two movable parts of a circular motor whose stator at least partially forms the body, the two movable parts being assigned to one and the same (e.g., a shared or common) circular path of this stator.

The two movable parts of the circular motor may be guided through one and the same guideway. Due to the properties of the robot described herein, the two movable parts turn about one and the same axis of rotation, which is defined by one and the same circular path, and in particular, by one and the same (e.g., a shared or common) guideway. This robot therefore has reduced dimensions relative to the conventional systems previously mentioned. Ultimately, such a robot is less complex, has a simplified assembly and is therefore less costly.

Further features and advantages of the robot according to example embodiments of the present invention are explained in the following description reference to the accompanying drawings.

BRIEF DESCRIPTION OF THE DRAWINGS

FIG. 5 shows a partial cross-sectional view of a robot according to an example embodiment of the present invention.

FIG. 6 shows a partial lateral view of the robot shown in FIG. 5.

DETAILED DESCRIPTION

Figure 1:
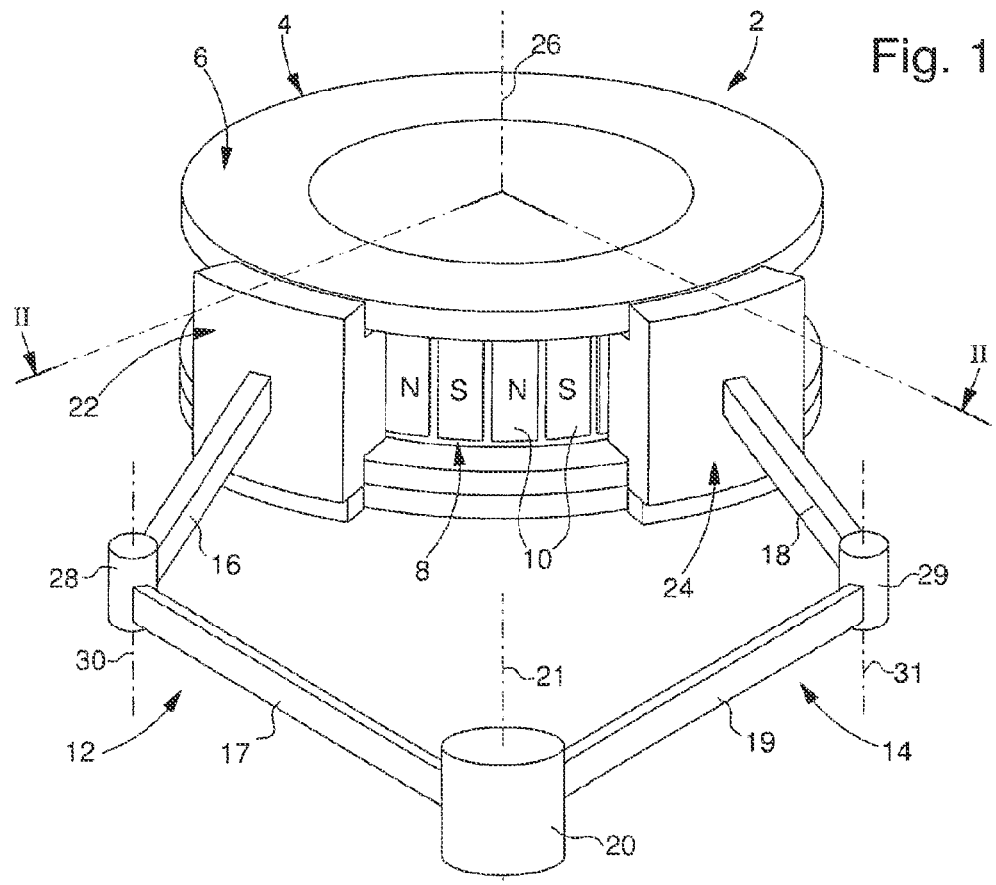
FIG. 1 shows a perspective view of a robot according to an example embodiment of the present invention.
Figure 2:
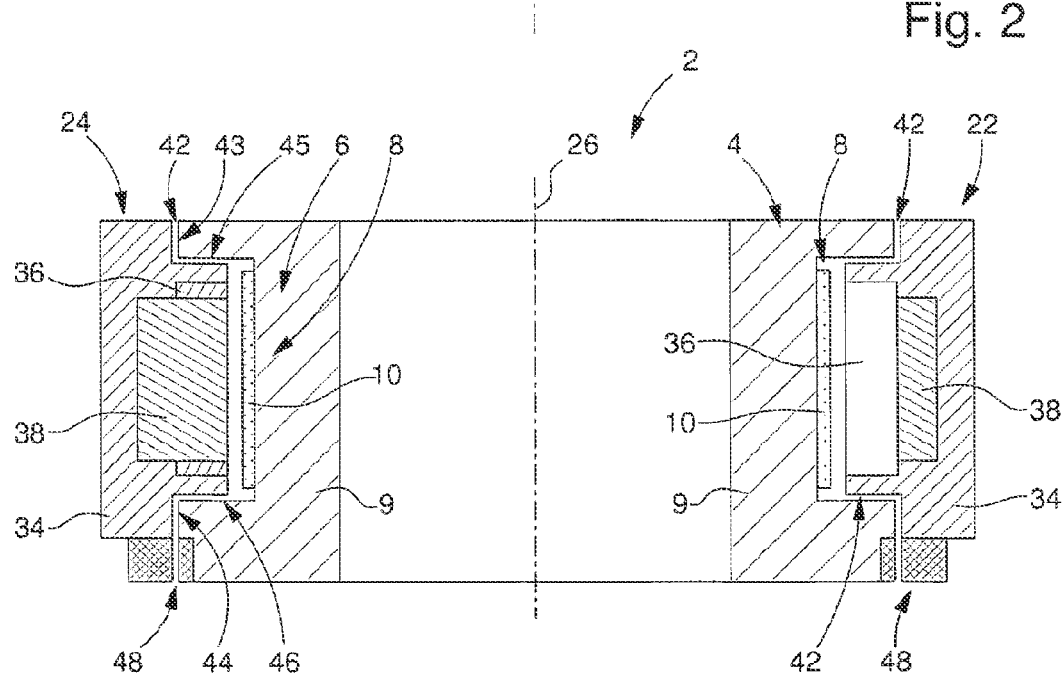
FIG. 2 shows a cross-sectional view of the robot taken along the line II-II of FIG. 1.

A robot according to an example embodiment of the present invention is shown schematically in FIGS. 1 and 2. Parallel robot 2 of the SCARA type includes a body 4, which is formed of a stator 6 and a circular electric motor. Stator 6 defines a circular path 8 which is formed of an annular magnet yoke 9, at whose outer lateral surface a plurality of permanent magnets 10, having alternating polarities, are disposed. Robot 2 then includes two articulated elements 12 and 14, each including an arm 16 and 18 and a forearm 17 and 19, respectively. The two respective outer ends of the two forearms 17 and 19 are connected in articulated fashion to an endpiece 20 (represented schematically in FIG. 1). This endpiece generally bears either a tool or a sensor.

The two articulated elements are attached to two annular segments 22 and 24, respectively, that form two movable parts of a circular motor which includes these two annular segments and stator 6. The two movable parts 22 and 24 are assigned to one and the same circular path 8 of this stator 6.

Thus, the two annular segments 22 and 24 are rotationally movable about one and the same axis of rotation 26. This axis 26 is defined by circular path 8, which in the present example is a magnetic path, since it bears the permanent magnets of the circular motor. Axis of rotation 26 corresponds to the axis of the machining of the outer lateral surfaces of magnet yoke 9 of the stator, especially cylindrical surfaces 43 and 44 which are used as guide surface for the annular segments. Since the two annular segments are movable along the same circular magnetic path 8 by supporting themselves against the same guide surface, it is ensured that these two segments turn about one and the same geometrical axis 26.

The two articulated elements 12 and 14 are thus able to lie in one and the same plane, which is perpendicular to axis of rotation 26. The arm and forearm of each articulated element are connected by a joint 28 and 29, respectively. In example embodiments, these joints 28 and 29 are formed by pivots having respective axes of rotation 30 and 31 that are parallel to each other and also to axis of rotation 26, and are parallel to the direction of the axis/axes of rotation of the joint(s), which are assigned to endpiece 20, that here are also formed of one or more pivots (represented schematically by axis 21 in FIG. 1).

Each of the two movable parts 22 and 24 includes a support 34, disposed in which are a plurality of coils 36 and a ferromagnetic piece 38 which is used to close the magnetic flux of permanent magnets 10. In addition, this ferromagnetic piece 38 may also be used to generate a magnetic attractive force between the movable part and circular path 8 having the plurality of permanent magnets. Thus, each annular segment, which forms a movable part, is prestressed by the magnetic attractive force. This represents an advantage for the assembly and the functioning of the robot relative to conventional robots, in which the rotatable supports, to which the articulated elements are attached, are formed by rigid rings. In such a ring, which forms the movable part of a circular motor, the coils are generally disposed with an axial symmetry, just like any existing magnetic cores. In such a case, the resulting magnetic attractive force on the movable ring is thus substantially zero.

Since the two movable parts 22 and 24 are mounted in a manner allowing rotation on one and the same circular path of the stator, it is possible to guide these two movable parts of the circular motor through one and the same guideway. This guideway 42 is preferably formed of an air bearing, which on one hand, is defined by cylindrical surfaces 43 and 44 of stator 6, facing which are corresponding cylindrical surfaces of support 34 of the movable part, and on the other hand, by annular surfaces 45 and 46 of the stator, facing which are corresponding annular surfaces of support 34 of this movable part. The compressed air fills an interspace between surfaces 43, 44, 45, 46 and the corresponding surfaces of movable parts 22 and 24, respectively. Therefore, on one hand, air bearing 42 holds the movable part, which experiences the magnetic attractive force of the magnets, at a certain distance from the outer circular surface of the stator, and on the other hand, positions the movable part precisely along the direction of axis of rotation 26, which has served for the machining.

Finally, each annular segment 22, 24 is assigned to a device 48 for measuring the angular displacement of the annular segment, that is, the displacement of this segment along the circular path of the stator.

Figure 3:
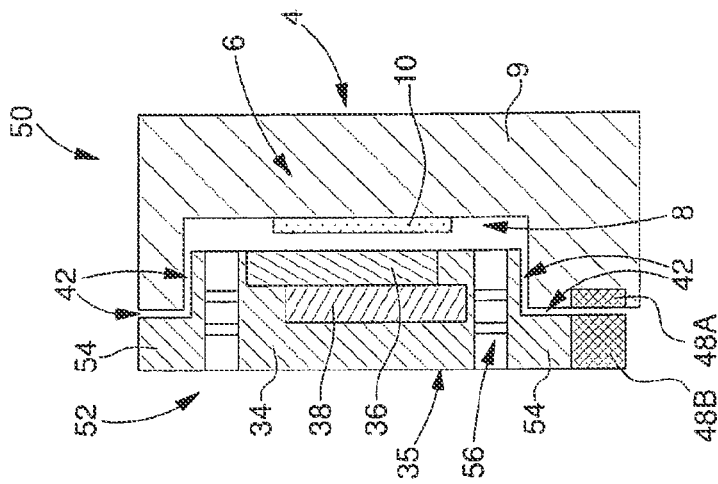
FIG. 3 shows a partial cross-sectional view of a robot according to an example embodiment of the present invention.
Figure 4:
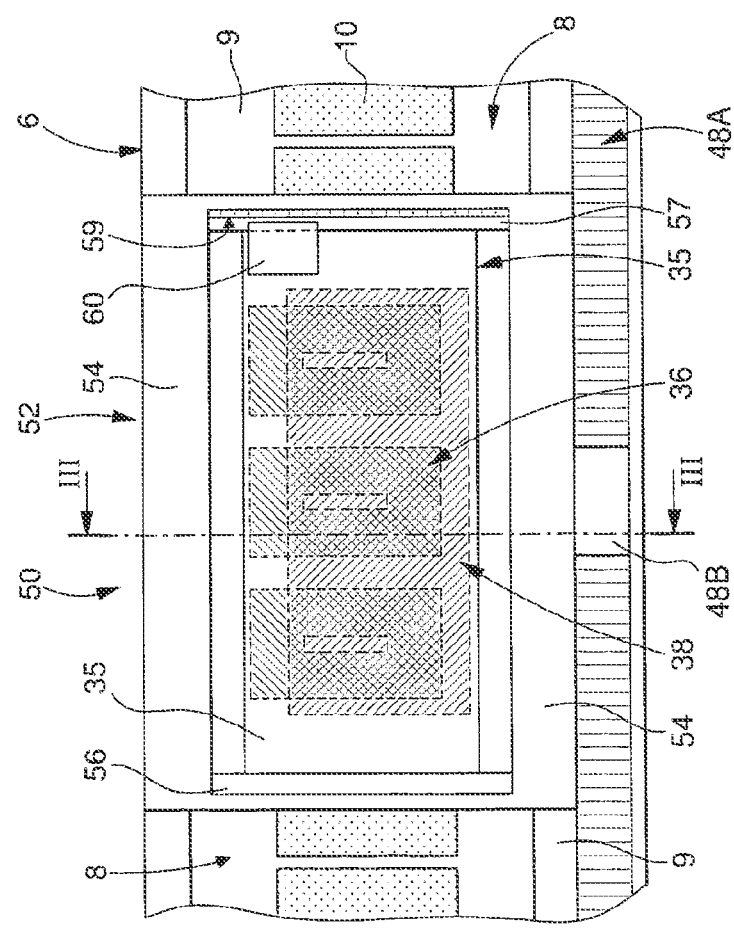
FIG. 4 shows a partial lateral view of the robot shown in FIG. 3.

A robot according to an example embodiment of the present invention is shown in FIGS. 3 and 4. The reference numerals already described before are not described here again in detail.

This example embodiment of the present invention differs from above-described example embodiment in that each of the two articulated elements of robot 50 has an arm which is attached to a movable part 52 having a frame 54, that is guided rotationally along circular path 8, as well as a middle part 35 that is disposed inside this frame, in order to be able to undergo a vertical displacement. The vertical displacement should be understood to be a displacement along the axis of rotation of movable part 52, this axis of rotation being defined by stator 6. Middle part 35 is guided through two linear bearings 56 and 57. In order to determine the position of this middle part along the direction of the axis of rotation of the circular motor, a measuring device is provided formed of a scale 59 and a read head 60. The angular displacement of frame 54 is measured by a circular scale 48A which is assigned to a read head 48B.

Both the rotatory displacement of movable part 52 and the displacement of middle part 35 relative to frame 54 along the direction of the axis of rotation are produced by the same plurality of coils 36. In the variant shown in FIG. 4, middle part 35 includes a plurality of coils (preferably a multiple of three), which are disposed in eccentric fashion relative to permanent magnets 10 of the circular magnetic path. These coils are placed such that their lower segments are generally situated perpendicularly to the axis of rotation of the circular motor, and lie opposite permanent magnets 10. The upper segments of the coils must not lie opposite permanent magnets 10. This configuration makes it possible for the same coils 36 to actuate the totality of part 52, movable rotationally along circular path 8, and also to displace the middle part along the direction of the axis of rotation of this movable part 52. Reference is mode to PCT International Patent Application Publication No WO 2007/026270 for the control of coils 36.

It should be noted that the coils may be disposed eccentrically in relation to permanent magnets 10, the upper segments lying opposite these magnets, while the lower segments lying at least for the most part in an area which is not overlaid on these magnets.

According to a further additional feature of this example embodiment, ferromagnetic piece 38, which is integrated into support 34 that forms middle part 35, is disposed eccentrically in relation to magnets 10 if, for example, this middle part lies in the middle of the window defined by frame 54. In view of the magnetic attraction of the magnets on ferromagnetic piece 38, this ferromagnetic piece defines a device for compensating for the gravitational force exerted on movable middle part 35. Ferromagnetic piece 38 is therefore positioned relative to permanent magnets 10 such that its rest position, which corresponds, for example, to a central position of middle part 35, is retained without the energizing of coils 36, which permits a reduction of the Joule losses in the coils. In this rest position, the force exerted by the magnets compensates exactly for the gravity intrinsic to middle part 35, as well as that of the arm, the forearm and the endpiece of the SCARA robot.

It should be mentioned that the arm of the articulated element which is assigned to movable part 52 is attached to middle part 35, so that this arm is able to undergo a rotary motion as well as a linear, vertical displacement. Consequently, it is possible to simplify the structure of endpiece 20, which no longer has to be able to bring about its own vertical linear movement.

FIGS. 5 and 6 show a third specific embodiment of a parallel robot according to an example embodiment of the present invention. The reference numerals already described before are not described here again in detail.

In this example embodiment, each movable part 64, which is assigned to an articulated element of robot 62, is able to undergo a displacement according to two degrees of freedom on a cylindrical surface 66 in two parts, which lie opposite the lower part and the upper part, respectively, of support 34 of movable part 64. An air bearing 67 is provided between cylindrical surface 66 and the corresponding cylindrical surface of support 34. Therefore, this arrangement permits movable part 64 to move on a cylindrical surface, that is, to be able to undergo a rotary motion according to the axis of rotation of the circular motor, and also to undergo a linear displacement along the direction of this axis of rotation.

As in the example embodiment described above, movable part 64 includes coils 36A and 36B which are disposed eccentrically in relation to permanent magnets 10 of magnetic path 8. These coils make it possible to drive movable part 64 in accordance with its two degrees of freedom. In the same manner, ferromagnetic piece 38, which is used for the return of the magnetic flux of the magnets, is disposed downwards in eccentric fashion relative to these magnets. Ferromagnetic piece 38 is therefore also used to compensate for the gravity which is exerted on movable part 64, as well as that of the arm, the forearm and the endpiece of the SCARA robot. In the example embodiment described above, only the middle part would have this compensation of the gravity, while in the present example embodiment, ferromagnetic piece 38 is disposed in relation to magnets 10 such that the attractive force of the magnets on this magnetic piece compensates for the gravity of the totality of movable part 64 in its rest position along the direction of the axis of rotation of the circular motor of robot 62. This makes it possible to reduce the Joule losses in the coils.

In view movable part 64 being formed of a cohesive block which may experience movements on a cylindrical surface, a device should be provided which is used to prevent this movable part 64 from suffering a tilting motion, that is, a rotary motion in accordance with a radial axis of stator 6. To that end, it is provided to dispose two groups of coils 36A and 36B which are controlled independently, in order to make it possible to generate a moment of force along a radial axis of the stator to permit control of the angular position of the movable part relative to such a radial axis, and therefore to keep the machining axis of cylindrical surface 66 parallel to the machining axis of the corresponding cylindrical surfaces of support 34 of movable part 62. To prevent movable part 64 from tilting, and consequently, in order to retain its spatial orientation on cylindrical surface 66, each movable part 64 is assigned to two linear sensors for the displacement along the direction of the axis of rotation of the circular motor. These two linear sensors are formed by the same scale 68 and two read heads 69 and 70, respectively. The control devices of the two groups of coils 36A and 36B interact with the two read heads 69 and 70 of the two respective sensors, in order to bring about the closed-loop control described above. Such a closed-loop control is described, for example, in U.S. Pat. No. 6,949,733, which uses coders that are sometimes called 1D+, and whose scale benefits from a special engraving process that allocates a longitudinal graduation and transverse graduation to the same support, scales 48A and 68 therefore being combined in a single element.

The example embodiments described above should not be considered limiting. For example, the position of the coils and of the magnets may be reversed in order to use fixed coils and movable magnets so as to facilitate the cabling.

What is claimed is:

1. A parallel robot, comprising:
    a body, at least a portion of the body arranged as a stator of a circular motor;
    two articulated elements, each element including an arm and a forearm connected by a joint, the articulated elements rotatable about a single geometrical axis;
    an endpiece, an outer end of each forearm connected to the endpiece in articulated manner; and
    two annular segments forming two movable parts of the circular motor, the two movable parts assigned to a common circular path of the stator, each articulated element attached to a respective annular segment;
    wherein the circular motor includes permanent magnets forming the circular path of the stator, each of the two movable parts including a plurality of coils and a ferromagnetic piece arranged to close a magnetic flux of the permanent magnets and to generate a magnetic attractive force between the movable part and the circular path to prestress the annular segment that forms the movable part by the magnetic attractive force.

2. The parallel robot according to claim 1, wherein the two movable parts of the circular motor are guidable via a common guideway.

3. The parallel robot according to claim 1, wherein each movable part is assigned to an air bearing.

4. The parallel robot according to claim 3, wherein the air bearing is adapted to permit a displacement with two degrees of freedom of each movable part on a cylindrical surface.

5. The parallel robot according to claim 4, wherein the plurality of coils includes two groups of coils controllable independently, and each movable part is assigned to two linear sensors for displacement along the geometrical axis, control devices of the two groups of coils adapted to interact with the two linear sensors to retain a spatial orientation of the movable part on the circular path.

6. The parallel robot according to claim 1, wherein each of the two movable parts includes a frame rotatably guidable along the circular path, a middle part arranged inside of the frame and movable along the geometrical axis.

7. The parallel robot according to claim 6, wherein both rotatory displacement and displacement along the geometrical axis are produced by the plurality of coils disposed eccentrically in relation to the permanent magnets and have at least one of (a) lower and (b) upper segments oriented perpendicularly to the geometrical axis and lie opposite the permanent magnets.

8. The parallel robot according to claim 6, wherein the ferromagnetic piece is adapted to compensate for a gravitational force exerted on the movable middle part.

9. The parallel robot according to claim 1, wherein the ferromagnetic piece is adapted to compensate for a gravitational force exerted on each movable part.

10. The parallel robot according to claim 1, wherein the robot is arranged as a SCARA robot.

* * * * *